United States Patent Office 3,331,677
Patented July 18, 1967

3,331,677
METHOD OF PREPARING PARTICULATE
FERTILIZER COATED WITH UREA-WAX
ADDUCT
Robert H. Campbell, Brookhaven, and William L. Huntington, King of Prussia, Pa., assignors to Sun Oil Company, Philadelphia, Pa., a corporation of New Jersey
No Drawing. Filed Feb. 20, 1964, Ser. No. 346,123
7 Claims. (Cl. 71—28)

This invention relates to an improvement in the method for preparing non-caking slow release fertilizers disclosed in a copending application, Ser. No. 346,067, filed concurrently herewith by R. H. Campbell and S. G. Belak which is a continuation-in-part of application Ser. No. 308,062, filed Sept. 11, 1963, and now abandoned by R. H. Campbell and S. G. Belak. The concurrently filed application is herein referred to as copending application I. The invention also relates to an improved method of preparing non-caking slow release fertilizers. By incorporating our improvement into the method previously disclosed, the storage stability of the non-caking slow release fertilizers is substantially improved.

The need for slow release fertilizers is well known. A slow release fertilizer is resistant to leaching by water and provides nutrients to the plants being fertilized at a predetermined rate irrespective for the most part of rainfall and other climatic conditions. Several such fertilizers have been proposed. One, for example, can be prepared by dispersing urea in molten paraffix wax, forming the dispersion into small, fertilizer size particles by means of, say, a mold, and allowing the particles to cool below the melting point of the wax. The resulting particles are a dispersion of solid urea particles in solid wax. Substantially all the particles of urea are surrounded by and encased in the wax. When submerged in water the urea is leached out of the particles only gradually, hence the particles are a slow release urea fertilizer. In another copending application, Ser. No. 308,251, filed Sept. 11, 1963 by R. H. Campbell, S. G. Belak, and A. J. Bozzelli, herein referred to as copending application II, slow release urea fertilizer compositions have been disclosed which have a higher water resistance than a dispersion of urea in wax alone as described above. These improved compositions comprise a dispersion of urea in wax, the wax having rosin and optionally, but preferably, asphalt dissolved therein. These compositions are described in more detail subsequently.

Any slow release fertilizer which comprises a dispersion of urea in wax has the disadvantage that the particles thereof generally tend to cake or congeal under some of the conditions normally encountered during normal storage and shipment of the fertilizer. The wax component of such fertilizers usually has a melting point of 125°–150° F. Such temperatures, however, are not unknown in warehouses and boxcars during the summer. If a bag of discrete particles of a dispersion of a fertilizer in wax is exposed to a temperature higher than the melting point of the wax component of the particles, the wax melts and the discrete particles become a single fluid mass. Even if the melting point of the wax is actually above the temperatures encountered during storage and shipment, the wax often becomes soft enough at these latter temperatures so that when bags of the discrete particles are stacked in piles 5–20 bags high, as is normal procedure, the pressure on the particles near the bottom of the pile is sufficient to cause these particles to agglomerate into large lumps.

In copending application I there is disclosed and claimed novel slow release urea fertilizer compositions which although they are a dispersion of urea in wax do not possess the above-mentioned disadvantages. The compositions are stable at temperatures substantially above the melting point of the wax contained therein, and can be subjected to conditions of temperature and pressure substantially more severe than those which would be normally encountered in commercial distribution without caking, agglomerating, congealing, etc. In addition to the compositions themselves the method of preparing them is also disclosed and claimed.

The novel compositions are, of course, in the form of small, discrete, fertilizer size particles. Each particle contains a core which is overlaid with a thin film which substantially completely covers the surface of the core. The core is a dispersion of urea in paraffin wax. The wax phase of the dispersion will in many cases contain one or more additives. The surface film covering this core is a urea-paraffin wax adduct. The film can be formed by contacting a particle which is a dispersion of urea in paraffin wax with an adduct accelerator such as acetone in liquid phase. An adduct accelerator causes the urea and paraffin wax at the surface of the dispersion particle to react to form a urea-paraffin wax adduct, the reaction occurring over substantially the entire surface of the dispersion particle. Stated in another manner, an adduct accelerator initiates, over substantially the entire surface of the particle, a reaction between the urea and paraffin wax at the surface of the particle to form an adduct. Removal of the adduct accelerator from the surface of the particle results in a particle which contains a core or center portion which is a dispersion of urea in paraffin wax and a thin film, overlaying and adjacent to the core or center portion, of a urea-paraffin wax adduct. If the resulting particle is subjected to conditions of temperature and pressure often encountered during normal storage and handling it is found to be substantially non-caking.

Unfortunately, the non-caking slow release fertilizer particles described above have often been found to be unstable during storage in that the water resistance of the particles one–two months after preparation of the particles is lower than the water resistance immediately after preparation. Since there may often be a lapse of one–two months between manufacture of the fertilizer and use thereof by the ultimate consumer, this change in water resistance is undersirable.

We have now found that this storage instability can be substantially reduced by reducing the adduct accelerator content of the final particles to less than 0.005%, preferably less than 0.001%. Although it is not known with certainty it is believed that the storage instability is due to the fact that when particles comprising a dispersion of urea in paraffin wax are contacted with a liquid adduct accelerator in order to cause the urea and wax at the surface of the particle to react to form an adduct, some of the accelerator penetrates through the interstices of the wax into the center portion of the particle. Although removal of the accelerator from the surface of the particle to form a thin adduct film thereon can be easily accomplished, such removal normally does not effect the removal of adduct accelerator which has permeated the surface of the particle. The accelerator trapped within the particle, although very small in amount, gradually causes some of the urea and paraffin wax in the center portion of the particle to react to form an adduct. Since the adduct itself generally has a lower water resistance than the original particle, the effect is a gradual decrease in the water resistance of the particle. Regardless of the theoretical explanation therefor, we have found that if the particles containing a thin film of adduct substantially completely covering their surface are dried to reduce the adduct accelerator content thereof to less than 0.005%, preferably less than 0.001%, the storage stability of the particles is substantially improved. All percentages herein are by weight.

In one aspect therefore our invention is an improvement on the method disclosed in copending application I for preparing non-caking fertilizers by treating particles which comprise a dispersion of urea in wax in order to form a thin adduct film on their surface. Since our improvement involves treating such particles, i.e., particles having a thin adduct film, the preparation of such particles will be described first after which our improvement will be more fully described.

The preparation of the non-caking fertilizer particles which comprise a dispersion of urea in paraffin wax and which have a thin film of a urea-paraffin wax adduct substantially completely covering their surface is best illustrated by first describing the preparation of particles which have no surface film but which are a dispersion of urea in paraffin wax, herein referred to as the base fertilizer particles, and then describing the treatment of such particles in order to form the surface film thereon.

The base fertilizer particles can be prepared in any suitable manner. For example, the paraffin wax is heated to above its melting point, the urea is added to the molten paraffin wax and the mixture is stirred in order to uniformly disperse the urea in the molten paraffin wax. The resulting dispersion is then shaped into fertilizer size particles by means of a pellet mold, etc., and the resulting particles are allowed to cool to a temperature below the melting point of the wax. The resulting particles are a dispersion of solid urea in solid wax. Substantially all the particles of urea are surrounded by and encased in wax.

In forming the base fertilizer particles it is desirable for several reasons that the urea be of small particle size. One reason is that the uniformity of the rate at which the urea is released to the plants when the non-caking fertilizer is ultimately placed in the soil is directly proportional to the uniformity of the fertilizer particle. The uniformity of the fertilizer particle is increased, of course, as the urea particle size decreases. The second reason for using small particle size urea is that the film of urea-paraffin wax adduct to be subsequently formed on the base particle is formed through a reaction of the urea at the surface of the base particle. Therefore, the amount of surface of the base particle which is actually covered by the subsequently formed adduct film varies with the distribution of urea (and the wax also) at the surface of the base particle. Preferably the distribution of urea at the surface of the base particle is substantially uniform over the entire surface of the base particle. This is also accomplished by using relatively small particle size urea. Preferably the urea dispersed in the paraffin wax has a particle size of smaller than 100 mesh, more preferably smaller than 200 mesh. All mesh sizes herein are by U.S. Standard Sieves.

When the urea employed is smaller than about 100 mesh it tends to agglomerate into lumps which makes it somewhat difficult to form a uniform dispersion of the urea in the wax in conventional agitated mixing vessels. This problem is readily overcome by forming an initial gross dispersion of relatively large size urea, such as commercial crystal urea which is mainly larger than 100 mesh, in the molten wax, and then passing this gross dispersion through a roller mill having a roller clearance sufficiently low to subdivide the urea particles to the desired size. By this technique the particle size of the urea dispersed in the wax is easily reduced to as small as 200 mesh or even 400 mesh. The dispersion discharged from the roller mill is usually a dry solid because the wax has solidified but upon reheating the dispersion the wax melts again.

In forming the base fertilizer particles any kind of paraffin wax can be used, paraffin wax being distinguished from other types of waxes hereinafter. However, it is preferable that the paraffin wax have a relatively low melting point because in subsequently forming the adduct film on the surface of the base particles the necessary time of contact between the base particles and the adduct accelerator varies directly with the melting point of the paraffin wax. Thus when the paraffin wax in the base particles has a melting point of 130° F., for example, the contact time is generally less than when the base particle paraffin wax has a melting point of, for example, 150° F. For this reason it is preferable that the paraffin wax used in forming the base particles have a relatively low melting point, e.g., 110°–145° F., although as discussed hereafter paraffin waxes of other melting points can be employed if desired.

When urea is dispersed in molten paraffin wax, preparatory to forming small fertilizer particles, the urea and wax often react to form an adduct before the dispersion can be shaped into small particles. The time required for this reaction to take place depends mainly upon the urea particle size. When the urea is larger than 100 mesh adduction may not occur for 15–20 minutes. On the other hand, if the urea is smaller than 100 mesh, say 200 mesh, adduction usually occurs in less than 5 minutes. Since this may not be enough time to form the dispersion into small particles it will usually be desirable to include in the paraffin wax phase an adduct inhibitor which is effective to prevent or at least substantially delay the adduct reaction. Suitable inhibitors which can be used are wax soluble polymers of vinyl type compounds such as polyethylene, polyisobutylene, copolymer of ethylene and vinylacetate, etc.; wood rosin in any of its various conventional forms; fatty acid nitrogen compounds such as fatty amides, fatty amines; alkanol amines such as triethanol amine; wax soluble condensation polymers such as wax soluble alkyd resins; microcrystalline wax, and the like. The amount of inhibitor used to prevent adduction is usually about 1–20%, preferably 3–10%, although higher amounts can also be used. In some cases, mentioned hereinafter, such higher amounts are sometimes desirable. It will be noted subsequently that the presence of the adduct inhibitor does not prevent the subsequent formation of the adduct film on the surface of the base particle.

It may also be desirable in some cases to incorporate certain other additives in the paraffin wax prior to dispersing urea therein. In copending application II two additives, rosin and asphalt, are disclosed which when dissolved in the wax component of a slow release fertilizer comprising a dispersion of urea in wax improve the properties thereof. The incorporation of either of these additives in our present compositions is a preferred embodiment thereof. The rosin, which can be wood, gum or tall oil rosin, and which can be unmodified rosin or any of the various rosin derivatives such as polymerized rosin, hydrogenated rosin, rosin esters, metal salts of rosin, etc., serves as an adduct inhibitor and also improves the water resistance of the fertilizer. For this latter purpose two types of rosin are preferred, although any others can also be used. One preferred rosin is the partially oxidized calcium salt of polymerized wood rosin, the salt containing (before oxidation) 7–10% calcium. This material is available in the unoxidized form as an article of commerce or can be made by known methods. Partial oxidation is disclosed in copending application II as a means of further improving the effectiveness of certain rosins for improving the water resistance of a urea-wax slow release fertilizer. The partial oxidation can be effected at any temperature but should be equivalent to oxidation in the presence of air, at atmospheric pressure, and at 140° F. for a time sufficient to improve the water resistance of the fertilizer composition when the latter is submerged in water. Water resistance is determined by submerging the particles in water and determining the amount of urea dissolved therein after 72 hours. Preferably the oxidation time is 1–8 days, more preferably 2–6 days. Prior to oxidation the rosin should be subdivided to 10–20 mesh. The other preferred rosin is polymerized wood rosin partially oxidized to the same extent as described for the calcium salt of polymerized wood rosin.

The other additive disclosed in copending application II is asphalt. If rosin is present in the wax, asphalt effects a further improvement in the water resistance of the resulting fertilizer. Regardless of whether rosin is present or not, the asphalt renders the dispersion of urea in wax substantially more fluid than it is without the asphalt. When small size, say 200 mesh, urea particles, or any other fertilizer particles, are dispersed in wax the resulting dispersion is very viscous, having a putty-like consistency. However, is asphalt is present in the wax when the dispersion is formed, the subsequent dispersion is very fluid, having about the fluidity of paint or melted chocolate.

The amount of rosin normally employed will be a minor amount, i.e., less than 50%, based on the total weight of wax and rosin if asphalt is absent, or based on the total weight of wax, rosin, and asphalt where the latter is also used. Preferably the amount of rosin is 2–35%, more preferably 3–20%. All percentages and parts herein are by weight. Where asphalt is used to fluidize a dispersion of urea in wax it should be used in amount of 1–20%, preferably 3–10%, by weight of the wax. Where asphalt is incorporated into the wax to improve the fertilizer water resistance, in which case rosin will also be present, the amount of asphalt should be a minor amount, based on the total weight of wax, rosin, and asphalt, effective to improve the fertilizer water resistance, preferably 0.25–40%, more preferably 3–20%.

In dispersing urea in paraffin wax to form the base particles of the invention, the relative amounts of urea and wax phase, the wax phase being defined as the paraffin wax plus any additives dissolved therein, will depend mainly upon the desired water resistance of the ultimate non-caking fertilizer particles and upon whether the ultimate particles are to contain other fertilizer ingredients in addition to urea. If urea is to be the only fertilizer ingredient in the base particles the amounts of urea and wax phase will normally be a major amount of urea, i.e., over 50%, and a minor amount, i.e., less than 50%, wax phase, the amounts and percentages being based on the total composition weight, although higher or lower amounts can also be used. In most cases the amount of urea will be 50–80%, more frequently 50–70% and the amount of wax phase will be 15–49%, more frequently 25–49%. If any additives are present in the paraffin wax the wax phase will normally contain a major amount of paraffin wax and a minor amount of additives.

If the fertilizer is to contain other solid fertilizer ingredients, such as any of those previously mentioned, the total amount of fertilizer ingredients will normally be a major amount and the amount of wax phase will normally be a minor amount. In most cases the total fertilizer ingredients will be 50–80%, more frequently 50–70% and the amount of wax phase will be 15–49%, more frequently 25–49%, the percentages and amounts again being based on the total composition. However, the actual amount of urea in the composition may be relatively low. For example, a slow release 5–15–10 complete fertilizer, i.e., a slow release complete fertilizer containing 5% nitrogen as N, 15% phosphorus as $P_2O_5$, and 10 potassium as $K_2O$, all by weight of the total composition, might contain 10.7% urea, 32.6% triple superphosphate, 18.5% potassium sulfate, and 38.2% wax phase. Usually the amount of urea will be at least 10% based on the total composition, more frequently at least 20%.

Thus, considering both the case where urea is the sole fertilizer ingredient and the case where a plurality of fertilizer ingredients are used the amount of urea will be 10–80%, usually 10–70%, more frequently 20–70% and the wax phase will usually be 15–49%, more frequently 25–49%.

It is generally desirable that the amount of urea and paraffin wax in the base particles be at least 10% and 15% respectively. This represents no serious obstacle since slow release urea-wax fertilizers will normally contain at least these amounts of urea and wax. Below these amounts, however, it is sometimes more difficult to form an adduct film which substantially completely covers the particle surface without having the film thicker than is normally desirable. This is due to the relatively low amount of urea and paraffin wax at the particle surface.

The base particles, prepared in a manner such as that described above, are then treated to form a thin film of urea-paraffin wax adduct on the surface thereof. A suitable and preferred treating procedure involves dipping the solid base particles into an adduct accelerator, for example, acetone in liquid phase, for about 12 seconds to 5 minutes, separating the particles from the acetone, and removing the residual acetone which adheres to the surface of the particles by, for example, allowing it to evaporate. Evaporation of this residual acetone from the surface of the wet particles, which occurs quite rapidly under normal atmospheric conditions but which can be hastened by the use of a fan, etc., leaves a film of urea-paraffin wax adduct on the surface of the particles. The formation of the thin adduct film, which itself is white to light gray in color, is readily observed when the base particles are black as is the case when they contain asphalt. When the particles are removed from the acetone they appear about the same, i.e., black, as before being dipped into the acetone, the only difference being that the particles appear wet. As the acetone on the surface of the particles evaporates, however, i.e., as the surface of the particles dries, the particles take on a gray appearance. This gray appearance is due to the thin film of adduct which forms over the surface of the particle. Apparently the adduct, or at least the urea component thereof, is soluble in acetone and hence no crystalline adduct appears until the acetone evaporates from the surface of the particle.

The thickness of the adduct film on a particle can be increased by increasing the time for which the particle is submerged in acetone. As an extreme case the entire particle can be converted to an adduct film. Also, thinner films are obtained by reducing the dipping time. If the particle is removed from the acetone too soon, the film fails to cover the particle surface, in which case the particle surface appears to have "freckles" of adduct on its surface. In such a case the dipping time should be increased. It is generally desirable for several reasons, however, that the adduct film be of very small thickness, about paper thin. One reason for this is that a film of about this thickness is all that is required to impart non-caking properties to the particle. A general rule is that if there is any visual thickness to the film when a treated particle is cut in half and examined, the film is thicker than is required to render the particle non-caking. The second reason for desiring a very thin film is that the urea component of the adduct film is, in most cases, rapidly leached out of the film when the particles are submerged in water. In other words the film portion of the slow release fertilizer is a fast release fertilizer. Since commercially acceptable fertilizer particles should have a longest dimension of about one-sixteenth inch at the most, a film of any considerable thickness will result in a substantial portion of the urea in the particle being fast release. This, of course, is undesirable. However, if a very thin film is formed the amount of urea actually present in the adduct film is small while non-caking properties are still obtained.

When employing a liquid adduct accelerator as in the above description the dipping time required to form an adduct film of the desirable thickness described is normally about 12 seconds to 5 minutes, usually 12–120 seconds, although somewhat longer or even shorter times will sometimes be more beneficial. The optimum dipping time varies depending upon such factors as the specific accelerator employed, the temperature of the accelerator and base particles, the melting point of the paraffin wax, and the presence of additives, and the specific type thereof, in the wax phase. Since the rate of the urea-paraffin wax adduction reaction increases with increasing temperature, the optimum dipping time can be shortened by raising the temperature of the base particles and/or the adduct accelerator. The influence of the paraffin wax melting point on the dipping time has already been described. Of the numerous accelerators acetone has been found so far to require the shortest dipping time, the time usually being about 12–60 seconds.

In the above description the adduct accelerator used to form the film was acetone. Although acetone is clearly the preferred accelerator other accelerators can also be used, for example, alcohols such as methanol, ethanol, and isopropanol, other ketones such as methyl isobutyl ketone, methyl ethyl ketone, etc., ammonia, aqueous ammonia, glycols such as ethylene glycol, low boiling mercaptans such as ethyl mercaptan, low boiling amines such as ethyl amine, dioxane, esters such as ethyl acetate, and the like. When these other accelerators are used, however, film formation generally takes longer than with acetone. For example, if a dispersion of urea in wax, the wax containing polymerized wood rosin dissolved therein, is dipped into methanol, removed, and the residual methanol on the surface of the dispersion allowed to evaporate, an adduct film does not result immediately upon completion of the evaporation step. Rather the film forms slowly over a period of 30 minutes to 2 days thereafter. In a commercial operation it would be more advantageous to use acetone and thus reduce the processing time required. For this reason acetone is clearly the preferred adduct accelerator. In addition any ketone or alcohol accelerator is preferable to the other accelerators mentioned since they are generally more efficient than the latter.

In copending application I it is disclosed that the adduct accelerator can, if desired, be used in vapor form, i.e., an adduct film can be formed on the surface of the base particles by contacting the base particles with acetone vapor, for example. However, the present invention is concerned only with those cases in which liquid adduct accelerator is used in forming the film. When accelerator vapor is employed the amount of accelerator which penetrates to the center of the particle is much less and the problem of storage instability is not nearly as great as when liquid accelerator is employed. The limitation to liquid accelerators does not, however, preclude the use in liquid form of such normally gaseous adduct accelerators as ammonia. Preferably, however, the accelerator employed is normally liquid, i.e., liquid at 25° C. and one atmosphere pressure.

Although the present invention is limited to those cases in which liquid accelerator is used, two method of practicing the invention should be distinguished both of which involve the use of accelerator vapor but only one of which is solely a vapor phase method. The distinction between the two methods is condensation of the accelerator vapor on the surface of the base particles. In one method, acetone vapor, for example, is passed through a bed of particles contained within a column, the conditions of temperature, pressure, etc. within the column being such that no condensation of the acetone vapor occurs. For example the temperature of the bed can be maintained higher than that of the incoming acetone vapor. This method is solely a vapor phase method. On the other hand, if the bed of particles is at a lower temperature than the acetone vapor some of the vapor will condense and liquid acetone will trickle over the particles. In this method the particles are being contacted with liquid acetone.

In copending application I it is also disclosed that water can be used as the adduct accelerator. Nevertheless the present invention is not applicable to those cases in which the adduct film is formed using water as the accelerator.

As pointed out previously the water resistance of the particles having a thin film of adduct on their surface formed with the aid of a liquid accelerator decreases with time, such a change being undesirable. We have found that if the particles having an adduct film are further dried so that the adduct accelerator content of the particles is reduced to less than 0.005%, preferably less than 0.001%, the storage stability of the particles is substantially improved.

When the particles are separated from the acetone, in the process of forming the thin adduct film using acetone as the adduct accelerator for illustrative purposes, the particles are visually wet. At this point the acetone content of the particles is substantial. If the particles are allowed to stand for several minutes, this acetone on the surface of the particles evaporates. As the last of the surface acetone evaporates the adduct film forms. At this point the particles appear dry, both visually and to the touch. If the particles are now analyzed for acetone it is found that the acetone content is about 0.01–0.02%. If the evaporation is hastened by blowing air over the particles the acetone content is still not reduced below 0.01–0.02%. These particles have poor storage stability.

The acetone content of the particles can be reduced to less than 0.005% by any convenient method. One suitable and preferred method of effecting this drying is by vacuum evaporation, the vacuum preferably being at least 15 inches of mercury. The temperature at which the vacuum evaporation is carried out can vary but is preferably in the range of room temperature (i.e., 25° C.) to about 60° C. Higher temperatures and lower pressures reduce, of course, the time required for removing the acetone. By adjusting the temperature, pressure, and drying time an acetone content of less than 0.001% is readily achieved.

Another suitable and preferred method of drying the particles to less than 0.005% acetone involves immersing the particles in a substantially saturated aqueous urea solution. The solution apparently enters the interstices of the wax and leaches out the acetone which has penetrated into the center portion of the particle. The immersion time required to leach out sufficient acetone to reduce the acetone content of the particle to less than 0.005% is normally about ½–4 minutes. In many cases an immersion time within this range will reduce the acetone content to less than 0.001%. If the acetone content is not as low as desired the immersion time should be increased or the particles should be immersed again in the aqueous urea solution. Preferably an immersion time of about 1–2 minutes is employed. The reason for using a substantially saturated aqueous urea solution is to prevent removal of the thin adduct film on the particle. Water per se can be used to leach out the acetone but it also dissolves the adduct film. This latter result is avoided by using water saturated, or at least nearly saturated, with urea. After the particles are removed from the urea solution they of course appear wet. Preferably they are dried by, for example, blowing air over their surface.

When other accelerators such as methanol are employed in forming the film, the techniques described above can be used to reduce the accelerator content of the final particles to less than 0.005%. For example, the particles are dipped in methanol for several minutes and are then removed and the methanol on the surface of the particles is allowed to evaporate. The thin adduct film usually does not form on the particles immediately upon removal of the surface methanol. The time which elapses before film formation will vary depending upon, for example, the composition of the base particles but is usually in the range of 30 minutes to two days. In any event, the particles are allowed to stand until the adduct film forms, at which point the methanol content of the particles will be about 0.01–0.02%, about the same as when acetone is used as the accelerator. The particles are then dried to reduce the methanol content to less than 0.005%, preferably to less than 0.001%.

It is implicit in the statement that the particles are dried to an adduct accelerator content of less than 0.005% that the accelerator content before such drying is greater than 0.005%. As already described the accelerator content of the particles after the adduct film forms is usually about 0.01–0.02% although in some cases unstable particles are found to have an accelerator content as low as 0.008% or as high as 0.04–0.05%. In other words the accelerator content of unstable particles is generally at least 0.008%, usually at least 0.01%. Also as described, the stability of the particles is improved by drying same to reduce the accelerator content thereof. The stability of the final particles will depend on the amount of accelerator removed, the stability increasing as the accelerator content of the particle decreases. For this reason it is preferable to reduce the accelerator content of the final particle to well below the 0.005% level which itself gives a substantial improvement in storage stability. Preferably the accelerator content of the final particle is less than 0.001%.

The term paraffin wax is used herein in accordance with its conventional meaning. It is one of only two kinds of waxes obtainable from petroleum, the other being microcrystalline wax. The differences and similarities between these two kinds of waxes are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
|---|---|---|
| Molecular Weight | 250–500 | 500–800 |
| Melting Point (ASTM D-127), °F | 110–165 | 140–210 |
| Viscosity at 210° F. (ASTM D-446), S.U.S. | 30–50 | 60–100 |
| Penetration at 77° F. (ASTM D-1321, 100 g., 5 sec.), dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. Preferably the paraffin wax used in the compositions of the invention has a melting point, viscosity, and penetration within the ranges specified in Table I. All wax properties mentioned herein are by the appropriate tests indicated in Table I. For the reason mentioned hereinbefore the paraffin wax more preferably has a melting point of 110°–145° F.

The following example illustrates the benefits that can be obtained by incorporating our improvement in the method disclosed in copending application I.

*Example*

36 parts of paraffin wax having a melting point of 129° F., a viscosity at 210° F. of 38 S.U.S. and a penetration at 77° F. of 18 dmm is charged to a mixing vessel equipped with heating and stirring means. The wax is heated to 240° F. To the wax is added 2 parts of polymerized wood rosin and 2 parts of asphalt. The rosin has been partially oxidized by heating at 140° F. for 3 days in the presence of air and at atmospheric pressure. The contents of the vessel are stirred until the rosin and asphalt dissolve in the wax. Next 60 parts of commercial crystal urea are added to the wax phase with stirring. This gross dispersion is then passed through a roller mill having a clearance small enough to subdivide the material passing therethrough to about 200 mesh. The discharge from the mill, a granular solid, is heated to 140° F. and thereupon becomes fluid. This fluid dispersion is molded into about 500 particles substantially spherical in shape and having a diameter of about 1/16 inch.

The entire quantity of particles is then submerged in acetone. After 30 seconds the particles are removed from the acetone, and it is observed that they are wet. They are immediately spread evenly on a circular piece of window screen about 15 inches in diameter. The screen has previously been positioned as follows: A conventional home type air fan having four 8 inch blades which turn at about 3450 r.p.m. and having the usual wire grid work around the blades to prevent contact therewith is laid down on a solid surface so that when the fan is running the air flow is upward. The circular piece of window screen is laid on top of and secured to the wire grid work of the fan.

When the particles are spread out on the screen the fan is running. The acetone on the surface of the particles immediately evaporates leaving a thin film of a urea-paraffin wax adduct substantially completely covering their surface. The evaporation of the acetone and the essentially simultaneous formation of the adduct film requires about 3–5 seconds. The particles are allowed to remain on the screen with the fan running for a total of 10 minutes. At this time they are removed from the screen and are found by vapor phase chromatography to contain 0.01% acetone. The water resistance of the particles is then determined by submerging a 10 gram quantity of the particles in water at room temperature and without agitation for 30 hours. At the end of this time the water is analyzed for urea and it is found that 24% of the urea originally present in the submerged particles has been leached out.

The remaining particles are then divided into three portions, A, B, and C. Those of portion A are not further treated. Those of portion B are placed in a vacuum oven maintained at room temperature and 29 inches of mercury vacuum. After 2 hours in the oven the particles are removed and analyzed for acetone. They contain 0.003% acetone. The particles of portion C are immersed in a saturated aqueous urea solution for 2 minutes with essentially no agitation. The particles are then removed and the water on the surface thereof is removable by blowing air over the particles by means of the fan-screen arrangement previously described. The dried particles have an acetone content of 0.003%.

The three portions are then placed in separate closed containers and are allowed to stand for 7 weeks. At this time the water resistance of the particles of each portion is determined by the water submergence test used initially. By comparing the water resistance of each portion after 7 weeks with the water resistance at the time the particles were prepared, a quantitative measure of storage stability is obtained. The data in Table II show these water resistances for each group of particles. The column "treatment" in Table II refers to the treating step applied to each portion of particles after formation of the shell thereon.

TABLE II

| Portion | Treatment | Percent Urea Leached Out of Particles After 30 Hours Under Water | |
|---|---|---|---|
| A | None | At Time of Preparation | 24 |
| | | 7 Weeks Later | 86 |
| | | Difference | 62 |
| B | Vacuum Evaporation | At Time of Preparation | 24 |
| | | 7 Weeks Later | 46 |
| | | Difference | 22 |
| C | Dip in Saturated Urea Solution | At Time of Preparation | 24 |
| | | 7 Weeks Later | 40 |
| | | Difference | 16 |

It is evident from the data presented in Table II that there is a distinctly smaller change in water resistance during storage with portions B and C, i.e., with the particles which are treated after formation of the thin adduct film in order to remove the acetone which had permeated the surface of the particles. In the case of the particles which are placed in the vacuum oven the reduction in water resistance during storage is reduced 64.5%. When the particles are dipped in the urea solution the reduction in water resistance during storage is reduced 74.2%.

When liquid accelerators other than acetone are employed substantial improvements in the storage stability of the particles is also obtained by drying the particles containing the adduct film to reduce the accelerator content thereof to less than 0.005%, preferably less than 0.001%.

The invention claimed is:

1. Method of reducing the caking tendency of solid discrete fertilizer particles comprising a dispersion of solid urea in solid paraffin wax which comprises (1) immersing said particles in a liquid urea-paraffin wax adduct accelerator other than water, whereby a reaction between urea and paraffin wax at the surface of said particles to form a urea-paraffin wax adduct is initiated, (2) continuing said immersing for at least 12 seconds and until said reaction is initiated over substantially the entire surface of said particles, (3) removing the particles from said liquid adduct accelerator in which they were immersed, (4) removing residual adduct accelerator from the surface of the wet particles thereby obtained, and (5) recovering discrete particles each of which contains (A) a core which comprises a dispersion of solid urea in solid paraffin wax and (B) a thin continuous film, overlaying and adjacent to said core, of a urea paraffin wax adduct formed in situ on the surface of said core, said thin continuous film substantially completely covering the surface of said core, and (6) removing residual adduct accelerator from the interior of said recovered particles until the adduct accelerator content of the recovered particles is reduced to less than 0.005%.

2. In a process for reducing the caking tendency of solid discrete fertilizer particles comprising a dispersion of solid urea in solid paraffin wax by (1) immersing said particles in a liquid urea-paraffin wax adduct accelerator other than water whereby a reaction between urea and paraffin wax at the surface of said particles to form a urea-paraffin wax adduct is initiated, (2) continuing said immersing for at least 12 seconds and until said reaction is initiated over substantially the entire surface of said particles, (3) removing the particles from said liquid adduct accelerator in which they were immersed, (4) removing residual adduct accelerator from the surface of the wet particles thereby obtained, and (5) recovering descrete particles each of which contains (A) a core which comprises a dispersion of solid urea in solid paraffin wax and (B) a thin continuous film, overlaying and adjacent to said core, of a urea-paraffin wax adduct formed in situ on the surface of said core, said thin continuous film substantially completely covering the surface of said core, the improvement for increasing the storage stability of the particles recovered in (5) which comprises removing residual adduct accelerator from the interior of said recovered particles until the adduct accelerator content of the recovered particles is reduced to less than 0.005%.

3. Process according to claim 2 wherein in said improvement the adduct accelerator content is reduced to less than 0.001%.

4. Process according to claim 2 wherein in (1) said liquid urea-paraffin wax adduct accelerator is acetone.

5. Process according to claim 2 wherein said liquid urea-paraffin wax adduct accelerator in (1) is selected from the group consisting of alcohols and ketones and wherein said immersing is for a period of 0.2–5 minutes.

6. Process according to claim 2 wherein said improvement is effected by vacuum evaporation.

7. Process according to claim 2 wherein said improvement is effected by immersing the recovered particles in a substantially saturated aqueous urea solution, whereby adduct accelerator is leached out of the particles, and removing the particles from said urea solution.

References Cited

UNITED STATES PATENTS

| | | | |
|---|---|---|---|
| 2,936,226 | 5/1960 | Kaufman et al. | 117—100 |
| 3,014,783 | 12/1961 | Young | 117—100 |
| 3,096,171 | 7/1963 | Woerther | 71—64 |

S. LEON BASHORE, *Acting Primary Examiner.*

ANTHONY SCIAMANNA, DONALL H. SYLVESTER, T. D. KILEY, *Assistant Examiners.*